United States Patent [19]
Wilkens

[11] Patent Number: 5,301,798
[45] Date of Patent: Apr. 12, 1994

[54] RECIPROCATING FLOOR CONVEYOR FOR CAUSTIC MATERIALS

[76] Inventor: Arthur L. Wilkens, R.R. 2, Box 46A, Osborne, Kans. 67473

[21] Appl. No.: 27,341

[22] Filed: Mar. 8, 1993

[51] Int. Cl.⁵ ............................................. B65G 25/00
[52] U.S. Cl. ................................. 198/750; 414/525.1
[58] Field of Search .................. 198/750; 414/525.1, 414/525.9

[56] References Cited

U.S. PATENT DOCUMENTS

| | | |
|---|---|---|
| Re. 33,196 | 4/1990 | Foster . |
| 3,534,875 | 10/1970 | Hallstrom, Jr. . |
| 4,474,285 | 10/1984 | Foster . |
| 4,492,303 | 1/1985 | Foster . |
| 4,571,150 | 2/1986 | Foster . |
| 4,580,678 | 4/1986 | Foster . |
| 4,679,686 | 7/1987 | Foster . |
| 4,691,819 | 9/1987 | Hallstrom, Jr. . |
| 4,709,805 | 12/1987 | Foster . |
| 4,712,467 | 12/1987 | Foster . |
| 4,727,978 | 3/1988 | Hallstrom, Jr. . |
| 4,748,893 | 6/1988 | Foster . |
| 4,748,894 | 6/1988 | Foster . |
| 4,749,075 | 6/1988 | Foster . |
| 4,785,929 | 11/1988 | Foster . |
| 4,817,783 | 4/1989 | Foster . |
| 4,821,868 | 4/1989 | Foster . |
| 4,823,938 | 4/1989 | Foster . |
| 4,856,645 | 8/1989 | Hallstrom, Jr. . |
| 4,858,748 | 8/1989 | Foster . |
| 4,896,761 | 1/1990 | Foster . |
| 4,899,870 | 2/1990 | Foster . |
| 4,907,691 | 3/1990 | Foster . |
| 4,923,356 | 5/1990 | Foster . |
| 4,940,132 | 7/1990 | Foster . |
| 4,962,848 | 10/1990 | Foster . |
| 4,966,275 | 10/1990 | Foster . |
| 4,969,387 | 11/1990 | Foster . |
| 4,969,389 | 11/1990 | Foster . |
| 4,984,679 | 1/1991 | Foster . |
| 4,990,048 | 2/1991 | Foster . |
| 5,000,647 | 3/1991 | Foster . |
| 5,064,052 | 11/1991 | Foster . |
| 5,156,259 | 10/1992 | Quaeck . |
| 5,165,525 | 11/1992 | Quaeck . |
| 5,222,592 | 6/1993 | Quaeck . |
| 5,222,593 | 6/1993 | Quaeck ............................... 198/750 |
| 5,228,556 | 7/1993 | Quaeck . |

*Primary Examiner*—D. Glenn Dayoan
*Attorney, Agent, or Firm*—Reising, Ethington, Barnard, Perry & Milton

[57] ABSTRACT

The reciprocating floor conveyor (10) has a floor support frame with crossbeams (28). A plurality of parallel, spaced apart guide beams (46) are secured to the crossbeams (28). Slide bearings (52) are attached to the guide beams (46). A floor slat (50) is slid over the slide bearings (52) and extends substantially the full length of the floor conveyor (10). A floor slat drive assembly (48) reciprocates the floor slats (50) back and forth in such a way that material supported by the floor slats is moved toward one end or the other of the floor slats. Each floor slat (50) has an upper section (82 or 92) that supports material to be conveyed and side bearing surfaces (84 or 94). The bearing surfaces are in constant sealing contact with bearing surfaces on adjacent floor slats. The floor slats (50) are an extruded thermoplastic. The sides of the floor slats (50) can have contoured bearing surfaces (104 and 108) which improve sealing and hold the floor slats in a common plane. The floor slats (50) can also be provided with a tongue (246) which is held in sealing contact with the surface (240) of a groove (236) on an adjacent floor slat by cargo. Laterally adjustable half floor slats (124), at each side of the reciprocating floor conveyor (10), maintain sealing contact between the bearing surfaces (84 or 94).

20 Claims, 4 Drawing Sheets

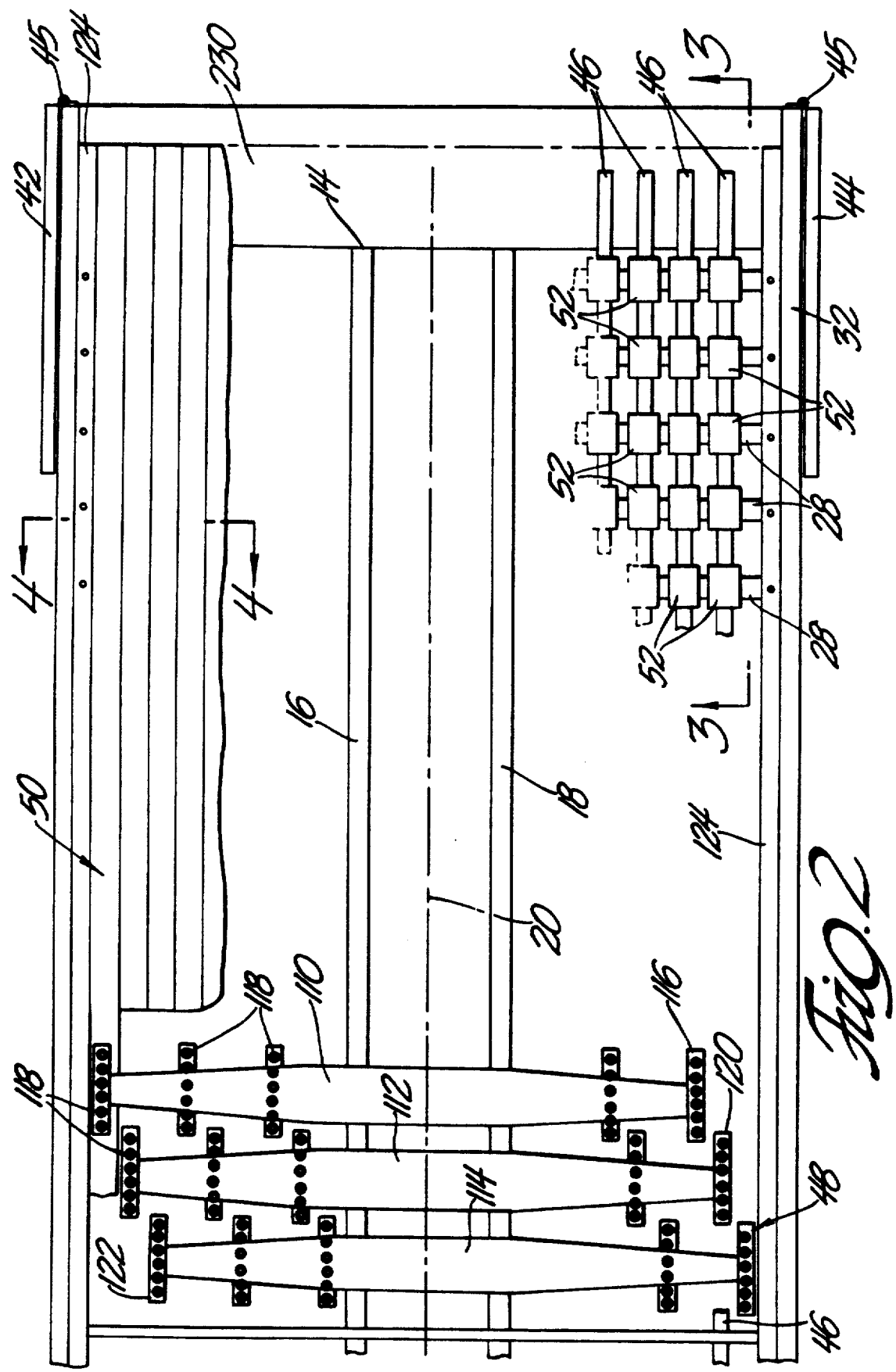

RECIPROCATING FLOOR CONVEYOR FOR CAUSTIC MATERIALS

TECHNICAL FIELD

This invention relates to reciprocating floor conveyors and particularly to floor conveyors for caustic materials.

BACKGROUND OF THE INVENTION

Reciprocating floor conveyors have been used for several years in van bodies and in trailers for unloading cargo. These conveyor systems are widely used for transporting bulk material such as ground plant material for animal feed, saw dust, wood chips, bark and plant material for human consumption. The conveyor systems include a plurality of parallel floor slats. Each floor slat is mounted so that it can slide back and forth in a direction parallel to its long axis.

Several different drives and drive systems have been employed in reciprocating floor conveyors to reciprocate the floor slats back and forth. A commonly used drive system includes three hydraulic cylinders that move all the slats simultaneously to the rear toward a rear discharge, carrying the cargo with them. The first cylinder is connected to every third floor slat. The second cylinder is connected to all the floor slats that are adjacent to a common side of the floor slats attached to the first cylinder. The third cylinder is attached to the floor slats that are between the floor slats driven by the first cylinder and the floor slats driven by the second cylinder. The first, second and third cylinders are activated one at a time to move every third floor slat forward and away from the rear discharge without moving cargo forward. The floor slats do not carry cargo forward because the two-thirds of the floor slats that are stationary while one cylinder moves one-third of the floor slats forward, hold the cargo. The second cylinder moves the floor slats connected to it forward while the floor slats connected to the first and third cylinders remain stationary. The third cylinder then moves the floor slats connected to the third cylinder forward while the floor slats connected to the first and second cylinders remain stationary. The above procedure is then repeated to move the cargo through a rear discharge opening. The procedure continues to be repeated until all the cargo is discharged.

The floor slats that are currently used are made from metal such as aluminum. Aluminum slats cannot slide against each other because of galling unless every other floor slat is anodized. It is expensive to anodize aluminum. Anodizing aluminum floor slats would eliminate the galling problem but would not solve the temperature expansion problem. Aluminum expands with temperature increases and contracts with temperature decreases. To accommodate aluminum thermal contraction and expansion, small gaps are provided between the floor slats of reciprocating floor conveyors. These gaps eliminate the thermal expansion problem as well as the galling problem.

The gaps between adjacent floor slats in reciprocating floor conveyors create two problems. One of the problems is loss of cargo. This is not a serious problem if the cargo is non-toxic and inexpensive. Loss of cargo is a serious problem however if the cargo is a toxic material or if the cargo is expensive. Another problem is cargo contamination. Cargo can be contaminated by material on a road surface that is thrown upwardly by vehicle wheels and passes through slots between floor slats. The cargo contamination problem is extremely serious if the cargo is for human or even animal consumption.

Two basic types of solutions to the problems caused by spaces between floor slats have been tried. One of the solutions is to catch material that passes between the floor slats in either direction. This solution adds weight and expense to reciprocating floor conveyor systems. Catching material that passes down between two slats also adds disposal problems if it is necessary to dispose of the material that is caught. Seals between floor slats have been the preferred solution to the problems. Seals between the slats can virtually eliminate cargo loss as well as cargo contamination. Seals between reciprocating floor slats have relatively short useful lives, take time to replace and are expensive. These seals are generally resilient and rely upon their resilience to maintain sealing contact. Seals that can be inflated have also been tried. Inflatable seals are deflated during conveying operations. There are many solid and semi-solid caustic materials which can be transported on and unloaded by reciprocating floor conveyors. Unfortunately aluminum floor slats have unacceptably short useful lives when they are in direct contact with caustic materials. Coatings on the aluminum floor slats extend their useful life somewhat. Unfortunately the sliding contact between cargo and floor slats that occurs during cargo unloading tends to remove coatings within a short period of time.

SUMMARY OF THE INVENTION

An object of the invention is to provide a reciprocating floor conveyor that can be used to transport caustic materials.

Another object of the invention is to provide a reciprocating floor conveyor with sealing contact between floor slats to prevent loss of cargo and to prevent cargo contamination due to the passage of contaminants through the floor.

A further object of the invention is to provide floor slats in a reciprocating floor conveyor which reduce the force required to reciprocate the floor slats.

The reciprocating floor conveyor for caustic materials is mounted in and forms the floor of a cargo container. The cargo container is mounted on a truck chassis or forms the body of a trailer. The trailer has a main frame supported by wheels and tires and adapted to be connected to a tractor fifth wheel at the front. A plurality of crossbeams, that are transverse to the long axis of the trailer are attached to the main frame. Side walls and a front end wall are attached to and supported by the ends of the crossbeams. A pair of doors form the rear wall of the cargo container. The doors are each pivotally attached to one of the side walls.

A plurality of parallel guide beams are attached to the crossbeams to guide and support the floor slats. A slide bearing is attached to each guide beam where the guide beam cross over and is attached to a crossbeam. Thermoplastic resin floor slats that extend substantially the length of the cargo container constitute the container floor. Each floor slat is supported by a group of slide bearings that have a common axis that is parallel to the long axis of the container. Each floor slat is in sealing contact with the floor slats adjacent to its sides and provide a sealed floor that extends from one side wall of the cargo container to the other.

A floor slat drive system is provided which reciprocates the floor slats back and forth to discharge cargo through an opening provided by hinged doors at the rear of the trailer or van. The drive includes three transverse floor slat drive beams. The first floor slat drive beam is connected to every third floor slat that make up the A group of floor slats. The second drive beam is connected to every third floor slat that makes up the B group of floor slats that are in contact with a common side of the A group of floor slats. The third drive beam is connected to every third floor slat that makes up the C group of floor slats that are each between and in sealing contact with an A group floor slat and a B group floor slat.

A first hydraulic cylinder is attached to the first drive beam to reciprocate the A group of floor slats back and forth. A second hydraulic cylinder is attached to the second drive beam to reciprocate the B group of floor slats back and forth. A third hydraulic cylinder is attached to the third drive beam to reciprocate the C group of floor slats back and forth. During unloading of the cargo container, a control system directs hydraulic fluid to the first, second and third hydraulic cylinders to move all three groups of floor slats toward the cargo discharge together. The cargo supported by the floor slats moves toward the cargo discharge with the floor slats. After the A, B and C groups of floor slats reach the rear limit of their travel, the control system directs hydraulic fluid to the first cylinder to move the A group of floor slats forward. After the A group of floor slats reach their limit of forward movement, the control systems directs hydraulic fluid to the second cylinder to move the B group of floor slats forward. After the B group of floor slats reach their limit of forward movement, the control system directs hydraulic fluid to the third cylinder to move the C group of floor slats forward. After the C group of floor slats reach their limit of forward movement, the control system directs hydraulic fluid to all three hydraulic cylinders to move the A, B and C groups of floor slats together toward the cargo discharge thereby starting the cargo unloading cycle over. The unloading cycle is continued until the cargo is all discharged.

The thermoplastic resin used to make the floor slats is dimensionally stable over a temperature range that allows the floor slats to be in sealing contact with each other. No space is required between the floor slats for thermal expansion. The thermoplastic resin also reduces frictional drag on the slats. The reduced drag on the slats reduces the pressure required to unload cargo with a given cylinder size.

The foregoing and other objects, features and advantages of the present invention will become apparent in the light of the following detailed description of an exemplary embodiment thereof, as illustrated in the accompanying drawing.

BRIEF DESCRIPTION OF THE DRAWING

FIG. 2 is a plan view of a portion of the reciprocating floor conveyor in a semi-trailer with some parts removed and other parts broken away to show the floor construction.

DESCRIPTION OF THE PREFERRED EMBODIMENT

Figure 1:
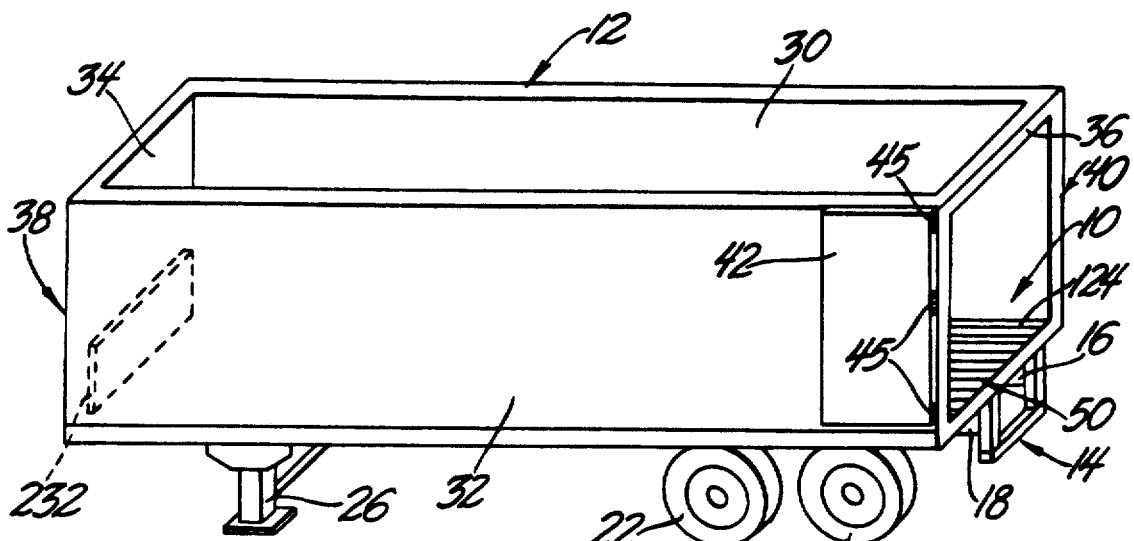
FIG. 1 is a perspective view of a semi-trailer employing a reciprocating floor conveyor for transporting caustic materials.
Figure 3:
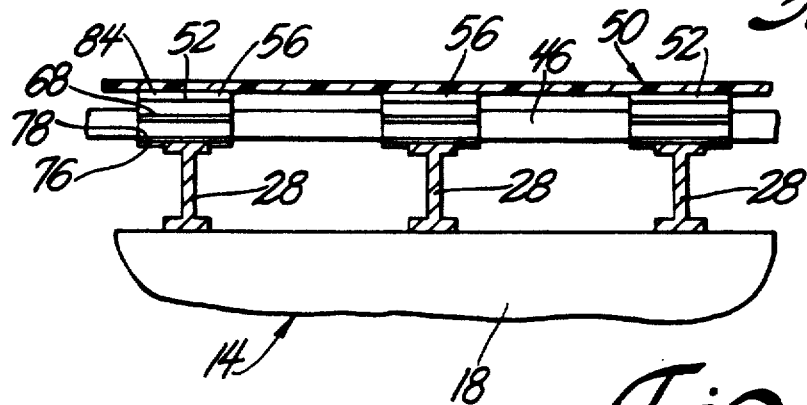
FIG. 3 is an enlarged sectional view of a portion of a reciprocating floor with the floor slats removed taken along line 3—3 in FIG. 2.

The reciprocating floor conveyor 10 for caustic materials is shown in the drawing as part of a semi-trailer 12. The reciprocating floor conveyor 10 could also be part of a van type body mounted on a truck chassis. The semi-trailer 12, as shown in FIG. 1 has a main frame 14 which includes a pair of spaced apart channel members 16, 18 that are parallel to a central axis 20 running the length of the semi-trailer 12. The rear portion of the semi-trailer 12 is supported by wheels and tires 22 and 24 that are rotatably journaled on conventional axles that are attached to the main frame 14 by a conventional suspension system. The front portion of the semi-trailer 12 is supported by an adjustable landing gear 26. A hitch pin (not shown), for attaching the semi-trailer to a fifth wheel on a tractor, is attached to the bottom side of the main frame 14 on the centerline 20 of the semi-trailer 12 forward of the landing gear 26. The channel members 16 and 18 end at a point to the rear of the hitch pin and are indirectly attached to the hitch pin to keep the height of the reciprocating floor conveyor 10 at the front of the semi-trailer 12 at about the same height as the height of the reciprocating floor conveyor at the rear of the semi-trailer.

A plurality of crossbeams 28, that are transverse to the centerline 20, are attached to the main frame 14. The crossbeams 28 as shown are aluminum I-beams. The spacing of the crossbeams 28 depends upon the intended use and the cargo the reciprocating floor conveyor 10 is to support. The crossbeams 28 have been placed on twelve inch centers in some semi-trailers 12. In other semi-trailers 12, the centerlines of the crossbeams 28 have been as much as fifteen inches apart.

A right side wall 30 is attached to the right hand ends of the crossbeams 28. A left side wall 32 is attached to the left hand ends of the crossbeams 28. A front end wall 34 is attached to the right side wall 30, the left side wall 32 and to the front portion of the main frame 14. The top and bottom of the right side wall 30, the left side wall 32 and the front end wall 34 are reinforced to provide structural integrity. A cross beam 36 is connected to the top of the right side wall 30 and the left side wall 32 at the rear of the semi-trailer 12 to reinforce the cargo container 38 and to define a rear discharge opening 40 that is substantially the sam height and width as the cargo container 38. Doors 42 and 44 for closing the discharge opening 40 are attached to the right side wall 30 and the left side wall 32 by hinges 45. The top of the semi-trailer 12 is open for depositing cargo in the cargo container 38.

A plurality of guide beams 46, that are parallel to the centerline 20 are welded to the tops of the crossbeams 28. The guide beams 46 are square tubes that extend substantially the entire length of the semi-trailer 12. The guide beams 46 each have an end that is adjacent to the front end wall 34 and an end that is adjacent to the doors 42 and 44 when the doors are closing the rear discharge opening 40. There is a section removed from each guide beam 46 in the center portion of the semi-trailer 12 for a floor slat drive assembly 48. The guide beams 46 are on centers that are spaced apart a distance equal to the width of floor slats 50. If the width of each floor slat 50 is three and five-eights of an inch, centerlines of the guide beams 46 are also three and five-eights of an inch apart. The number of guide beams 46 required depends upon the inside width of the cargo container 38 and the width of the floor slats 50. In some reciprocating floor conveyors 10 twenty-four or even more guide beams 46 are required. Reciprocating floor conveyors 10 with wide floor slats 50 have been used which employ two spaced side by side guide beams 46 for each floor slat.

Slide bearings 52 are attached to the guide beams 46 at each point where the guide beam 46 is welded to a crossbeam 28. The slide bearings 52, which are made from a thermoplastic resin such as alatron, have an upper section 54 with a flat bearing surface 56. Two spaced apart vertical side plates 58 and 60 extend downwardly from the upper section 54 and define a guide beam passage 62. Two ears 64 on the bottom of the vertical side plate 58 extend under the guide beam 46 and two ears 66 on the bottom of the vertical side plate 60 extend under the guide beam 46 to retain the slide bearing 52 on the guide beam 46. One of the ears 64 and one of the ears 66 are adjacent to the front side of a crossbeam 28 to prevent movement of the slide bearing 52 to the rear on the guide beam 46. The other ear 64 and the other ear 66 are adjacent to the rear side of a crossbeam 28 to prevent movement of the slide bearing 52 to the front on the guide beam 46. A flange 68 with a horizontal floor slat hold down surface 70 extends outwardly from the vertical side plate 58. A flange 72 with a horizontal floor slat hold down surface 74 extends outwardly from the vertical side plate 60. A flange 76 with a horizontal floor slat support surface 78 extends outwardly from the vertical side plate 58 and is in contact with and supported by an upper surface of a crossbeam 28. A flange 80 with a horizontal floor slat support surface 81 extends outwardly from the vertical side plate 60 and is in contact with and supported by an upper surface of a crossbeam 28.

Figure 4:
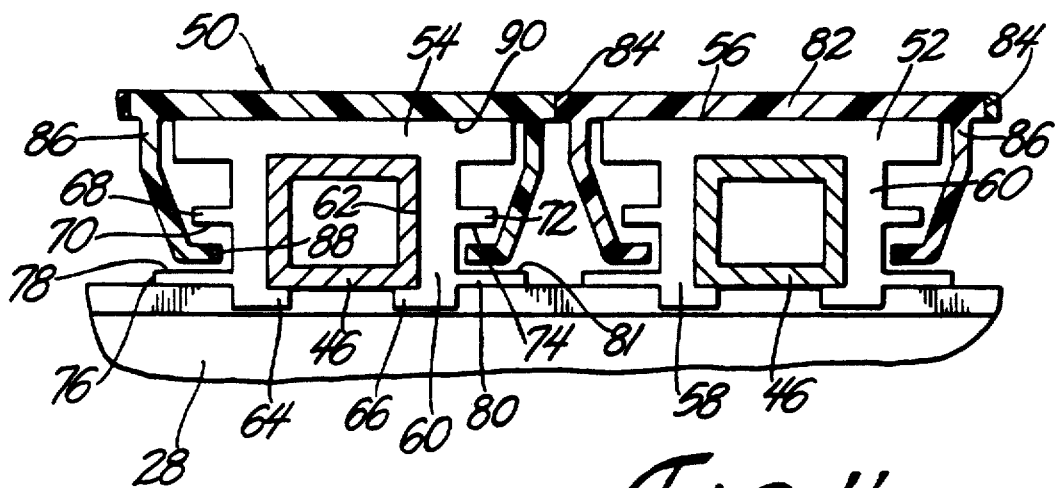
FIG. 4 is an enlarged sectional view of a portion of the reciprocating floor structure including floor slats taken along line 4—4 in FIG. 2.

The floor slats 50 as shown in FIG. 4 are extruded members with a horizontal upper section 82. Both sides of the horizontal upper section 82 have a generally vertical bearing surface 84. The generally vertical bearing surfaces 84 on the floor slats 50 contact the bearing surfaces on adjacent floor slats to prevent lateral movement of floor slats and to support lateral forces when the reciprocating floor conveyor is tilted to one side. The vertical bearing surface 84 also functions as a sealing surface and is in continuous contact with the bearing surfaces on adjacent floor slats 50. Integral side walls 86 extend downwardly from the horizontal upper section 82. A generally horizontal flange 88 is integral with the lower edge of each side wall 86. The generally horizontal flanges 88 extend inwardly toward each other. The side walls 86 of the floor slats 50 shown in FIG. 4 are inset from the bearing surface 84 so that they do not contact the side walls 86 of adjacent floor slats 50. The floor slat 50 shown in FIG. 4 is made from a thermoplastic resin, such as polyvinyl chloride, which has tough low friction bearing surfaces, dimensional stability over a range of ambient temperatures is relatively light weight and that is as strong as or stronger than aluminum.

The under surface 90 of the horizontal upper section 82 of each of the floor slats 50 shown in FIG. 4 contacts and slides on the flat bearing surface 56 on the upper section 54 of the slide bearings 52. The weight of the cargo supported by each floor slat 50 is transferred directly to the slide bearings 52 through the contact between under surface 90 and the flat bearing surface 56. The generally horizontal flanges 88 of the floor slats 50 are positioned between the floor slat hold down surfaces 70 and 72 and the slat support surfaces 78 and 82 on the slide bearings 52. One purpose of the generally horizontal flanges 88 on the floor slats 50 is to contact the slat hold down surfaces 70 and 74 on the slide bearings 52 to prevent the floor slats from lifting up off of the flat bearing surface 56 more than a short distance and interfering with reciprocating movement of the floor slats. Another purpose of the generally horizontal flanges 88 on the floor slats 50 is to contact the slat support surfaces 78 or 81 on the slide bearings 52 to prevent rotation of a floor slat about an axis running the length of the floor slat. The slat support surfaces 78 and 81 on the slide bearings 52 can also cooperate with and support the generally horizontal flanges 88 on a floor slat to limit deflection of the horizontal upper section 82 when the floor slats are overloaded. During normal operation and use of the floor slats 50, the generally horizontal flanges 88 are out of contact with the slide bearings 52 and the various surfaces on the slide bearings.

Figure 5:
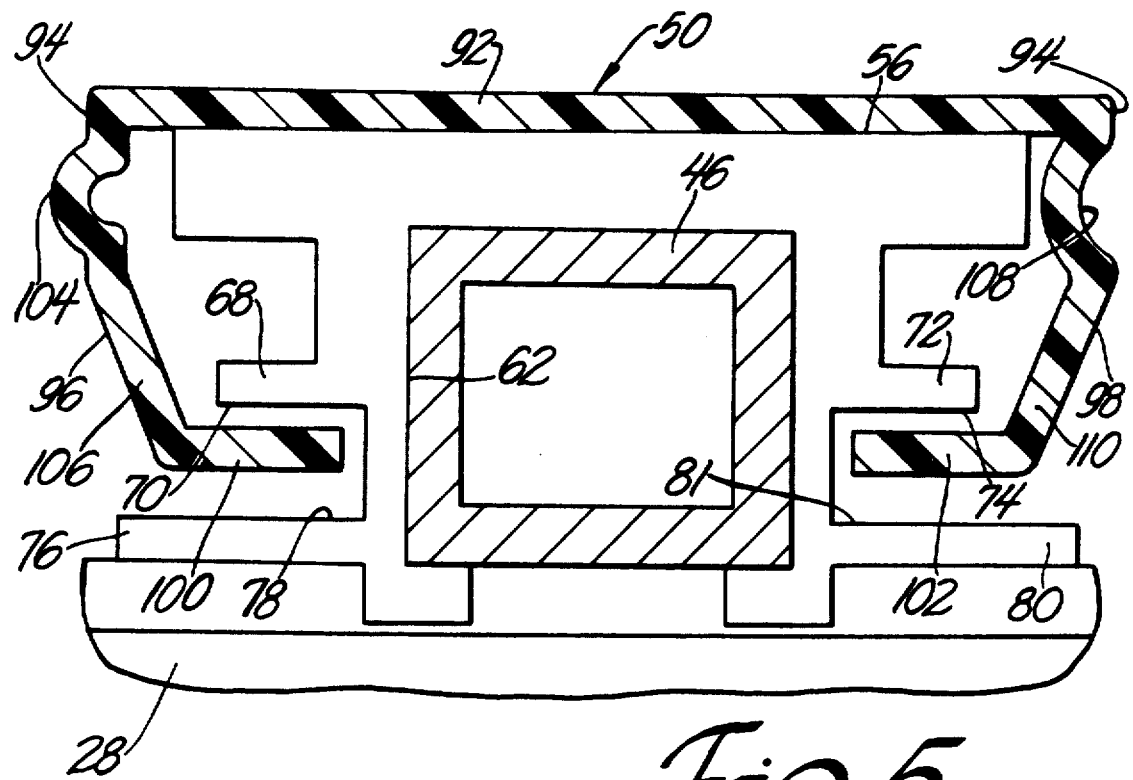
FIG. 5 is an enlarged sectional view taken along line 4—4 in FIG. 2 with a modified floor slat.

An alternate floor slat 50 is shown in FIG. 5. The alternate floor slat 50 is an extruded member with a horizontal upper section 92. Both sides of the horizontal upper section 92 have a generally vertical bearing surface 94. The bearing surface 94 also functions as a sealing surface and is in continuous contact with the bearing surfaces on adjacent floor slats 50. Integral side walls 96 and 98 extend downwardly from the horizontal upper section 92. Generally horizontal flanges 100 and 102 integral with the lower edge of each side wall 96 and 98, and extend inwardly toward each other. The integral side wall 96 has a convex surface 104 below the generally vertical bearing surface 94. A lower section 106 of the side wall 96 extends downwardly and inwardly toward the side wall 98 from the upper section with convex surface 104. The integral side wall 98 has a concave surface 108 below the generally vertical bearing surface 94. A lower section 110 of the side wall 96 extends downwardly and inwardly toward the side wall 96 from the upper section with the concave surface 108. The convex surface 104 on one floor slat 50 contacts the concave surface 108 on an adjacent floor slat to provide additional side bearing surface. The extension of the convex surface 104 into the recessed area defined by the concave surface 108 on an adjacent floor slat prevents vertical movement of one floor slat 50 relative to an adjacent floor slat 50. The concave surface 108 and the convex surface 104 which have the same radius of curvature also increase sealing area and improve sealing between adjacent floor slats 50. The horizontal flanges 100 and 102 on the floor slats 50 shown in FIG. 5 cooperate with the slide bearings 52 and perform the same functions as the horizontal flanges 88 on the floor slats shown in FIG. 4. However, the concave surface 108 cooperates with the convex surface 104 on the floor slats 50 shown in FIG. 5 to resist rotation of floor slats about an axis running the length of the floor slat thereby reducing the need for the slat support surfaces 78 or 81 on the slide bearings 52 to cooperate with the generally horizontal flanges 100 or 102 to resist rotation of the floor slats about an axis running the length of the floor slat. The slat support surfaces 78 and 81 on the slide bearing 52 are available to cooperate with the generally horizontal flanges 100 and 102 to resist rotation of floor slats about an axis running the length of the floor slats if required. The generally horizontal flanges 100 and 102 also cooperate with the floor slat support surfaces 78 and 81 on the slide bearings 52 to limit deflection of the horizontal upper section 92 of an overloaded floor slat.

Figure 8:
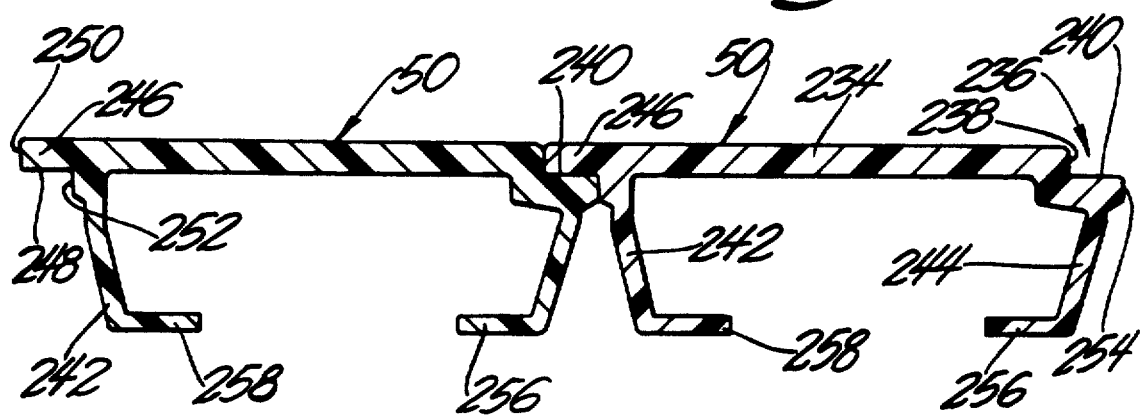
FIG. 8 is an enlarged sectional view taken along line 4—4 in FIG. 2 with a modified floor slat.

Another alternative floor slat 50 is shown in FIG. 8. This alternative floor slat 50 is an extruded member with a horizontal upper section 234. The horizontal upper section 234 has a notch 236 on one side with a vertical surface 238 and a horizontal surface 240. Integral side walls 242 and 244 extend downwardly from the horizontal upper section 234. The integral side wall 242 is positioned inboard relative to the horizontal upper section 234 to form a tongue 246. The integral side wall 244 is positioned outboard relative to the horizontal upper section 234 to form the notch 236 described above. The tongue 246 has a horizontal bottom surface 248 and a vertical side surface 250. The vertical side surface 250 of the tongue 246 can contact the vertical surface 238 of the notch 236 in an adjacent floor slat 50 to limit lateral movement of floor slats relative to each other. Additional vertical bearing surfaces 252 and 254 can be provided on the integral side walls 242 and 244 to limit lateral movement of the floor slats 50 relative to each other. The horizontal bottom surface 248 of the tongue 246 is in contact with the horizontal surface 240 of the notch 236. When the floor slats 50 are supporting cargo, the force from the cargo holds the horizontal bottom surface 248 on the tongue 246 in sealing contact with the horizontal surface 240 of the notch 236. The force exerted by the cargo forms a tight seal between the horizontal bottom surface 248 and the horizontal surface 240. Metal slats with a tongue on one side that runs in a groove in an adjacent slat would require very high force to move one slat relative to the other when the slats are supporting cargo due to frictional contact. The wear rate for metal slats would also be unacceptable.

The vertical side surface 250 on the tongue 246 can be in sealing contact with the vertical surface 238 of the notch 236 in an adjacent floor slat 50 if desired. Sealing contact between the vertical surface 250 and the vertical surface 238 on an adjacent floor slat 50 can improve sealing efficiency and reduce the possibility of leaks between floor slats. Holding the vertical bearing surfaces 252 and 254 on the integral side walls 242 and 244 of adjacent floor slats 50 in sealing contact will further reduce the possibility of leaks between floor slats 50. Contact between the horizontal bottom surface 248 and the horizontal surface 240 will normally provide adequate sealing without forcing vertical surfaces on adjacent floor slats 50 into sealing contact.

The tongue 246 on one side of the floor slats 50 shown in FIG. 8 is substantially the same size as the notch 236 on the other side. The notch 236 and the tongue 246 cooperate to position the upper surface of the horizontal upper section 234 of adjacent floor slats 50 in a common horizontal plane.

The generally horizontal flanges 256 and 258 shown in FIG. 8 are integral with the lower edges of the side walls 242 and 244. These horizontal flanges 256 and 258 contact surfaces on the slide bearings 52 to limit vertical movement of the floor slats 50 when the floor slats are not supporting cargo. The horizontal flanges 256 and 258 also limit vertical movement of the floor slats 50, when the floor slats are overloaded, by contacting the horizontal floor slat support surfaces 78 and 81 on the flanges 76 and 80 of the slide bearings 52. The tongue 246 cooperates with the notch 236 in an adjacent floor slat 50 to limit vertical movement of one floor slat relative to an adjacent floor slat in one direction but not in the other direction.

The floor slat drive assembly 48 includes transverse drive beams 110, 112 and 114. The transverse drive beam 110 has a plurality of spaced apart floor slat connectors 116 that are connected to each A floor slat 50, by bolts 118. The transverse drive beam 112 has a plurality of spaced apart floor slat connectors 120 which are connected to each B floor slat 50 by bolts 118. The B floor slats 50, as shown in FIG. 2 are on the left hand side of each A floor slat. The transverse drive beam 114 has a plurality of spaced apart floor slat connectors 122 which are connected to each C floor slat 50 by bolts 118. The C floor slats 50 are positioned between each A floor slat and B floor slat. The bearing surfaces 84 or 94 on each of the A, B and C floor slats 50 are in sealing contact with the bearing surfaces on the floor slats adjacent to their right and left sides. At the right and left edges of the reciprocating floor conveyor 10 adjacent to the right side wall 30 and the left side wall 32 is a non-reciprocating half floor slat 124. The half floor slat 124 has been cut through the horizontal upper section 82, 92 or 234 along its entire length. The left half of the half floor slat 124 is bolted to the crossbeams 28 adjacent to the right side wall 30 with its integral left side wall 86 or 96 to the left. The right half of the floor slat 124 is bolted to the crossbeams 28 adjacent to the left side wall 32 with its right integral side wall 86 or 98 to the right. The two half floor slats 124 can be adjusted horizontally toward or away from the center line 20 of the trailer to establish sealing contact between all of the floor slat bearing surfaces 84 and 94. The horizontal adjustment of the half floor slats 124 toward or away from the center line 20 can be made at the time of assembly or slots can be provided for the bolts that secure the half floor slats to the crossbeams 28 to facilitate field adjustment. The floor slats 50 can move laterally on the slide bearings 52 toward or away from the centerline 20 to insure that bearing surfaces 84 or 94 on the sides of the floor slats are in sealing contact with bearing surfaces on adjacent floor slats.

Figure 6:
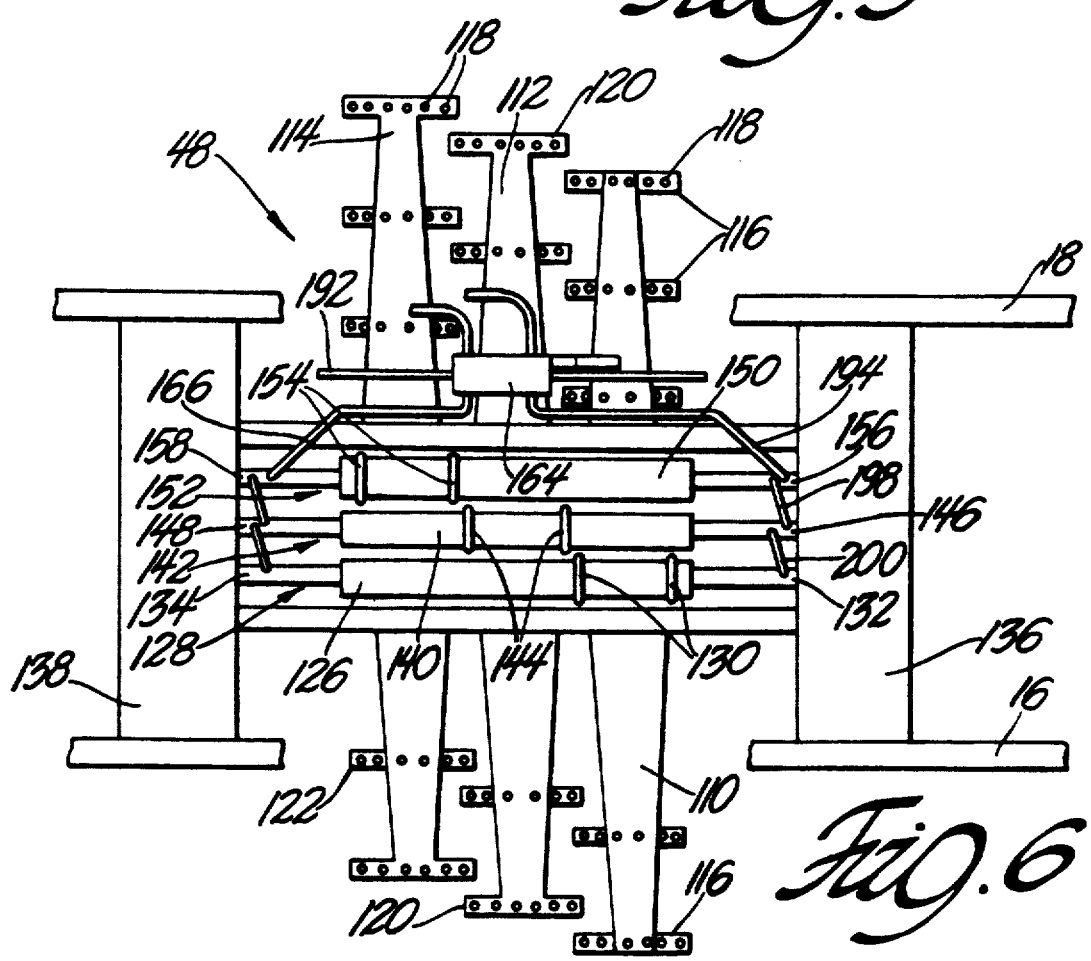
FIG. 6 is a bottom view of a floor slat drive.

The transverse drive beam 110, as shown in FIG. 6 is clamped to the cylindrical barrel 126 of a hydraulic cylinder assembly 128 by U-clamps 130. The hydraulic cylinder assembly 128 has two piston rods 132 and 134 which are fixed to crossbeams 136 and 138 that are secured to the spaced apart channel members 16 and 18 forward of the wheels and tires 22 and 24 and to the rear of the landing gear 26 and the hitch pin for attaching the semi-trailer 12 to a fifth wheel. Hydraulic fluid under pressure is supplied to the hydraulic cylinder assembly 128 to move the A floor slats 50 back and forth. The transverse drive beam 112 is clamped to the cylindrical barrel 140 of a hydraulic cylinder assembly 142 by U-clamps 144. The hydraulic cylinder assembly 142 has two piston rods 146 and 148 which are fixed to crossbeams 136 and 138. Hydraulic fluid under pressure is supplied to the hydraulic cylinder assembly 142 to move the B floor slats 50 back and forth. The transverse drive beam 114 is clamped to the cylindrical barrel 150 of a hydraulic cylinder assembly 152 by U-clamps 154. The hydraulic cylinder assembly 152 has two piston rods 156 and 158 which are fixed to crossbeams 136 and 138. Hydraulic fluid under pressure is supplied to the hydraulic cylinder assembly 152 to move the C floor slats 50 back and forth.

Figure 7:
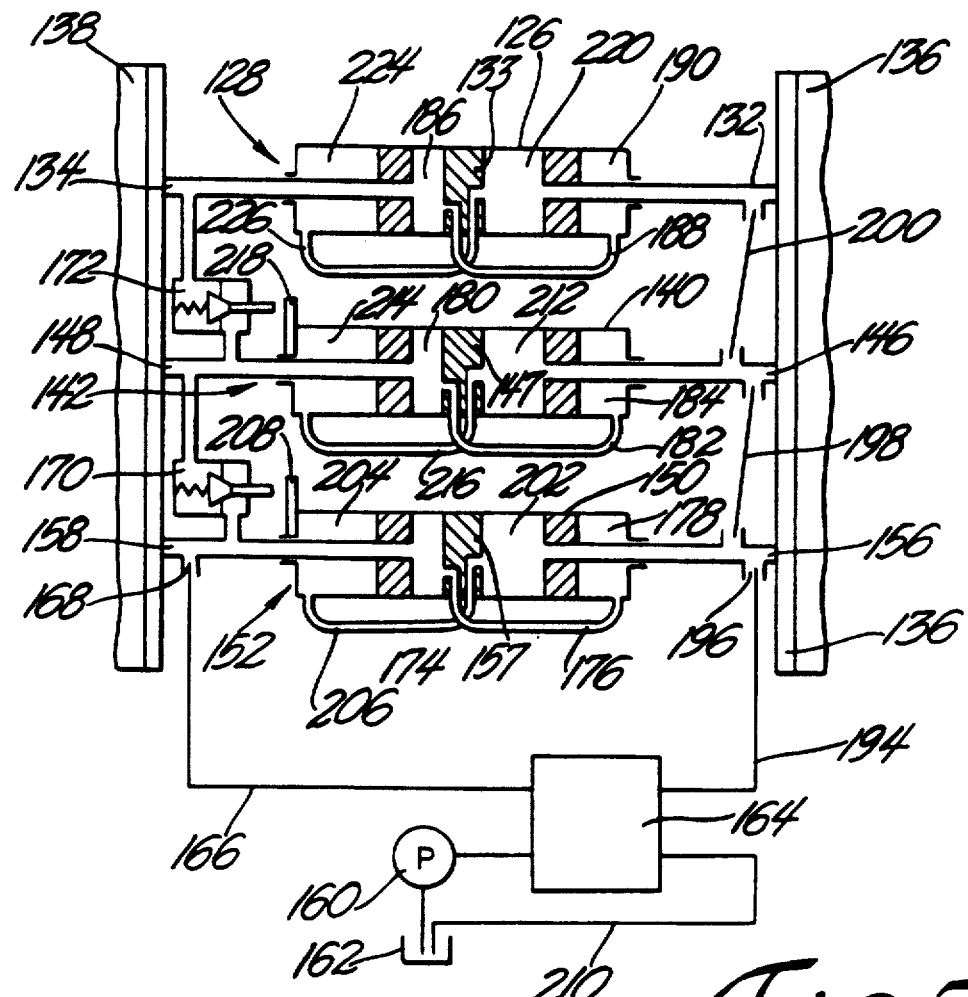
FIG. 7 is a schematic view of a floor slat drive system.

Hydraulic fluid is supplied to the hydraulic cylinder assemblies 128, 142 and 152 by a hydraulic pump 160 shown schematically in FIG. 7. The hydraulic pump 160 draws hydraulic fluid from a sump 162 and supplies the hydraulic fluid to a switching valve 164. The switching valve 164 supplies hydraulic fluid from the hydraulic pump 160 to conduit 166 and port 168. The pressure of hydraulic fluid at port 168 opens valves 170 and 172 so that hydraulic fluid under pressure is supplied simultaneously to hydraulic cylinder assemblies 128, 142 and 152 to move all of the floor slats 50 to the rear together. Hydraulic fluid supplied to the hydraulic cylinder assembly 152 through the piston rod 158 flows into chamber 174 and through a passage 176 to a chamber 178 and moves the cylindrical barrel 150 to the rear and toward crossbeam 136. Hydraulic fluid under pressure from the port 168 passes through open valve 170 and through the piston rod 148 of the hydraulic cylinder assembly 142. Hydraulic fluid supplied to the hydraulic cylinder assembly 142 through the piston rod 148 flows into a chamber 180 and through a passage 182 to a chamber 184 and moves the cylindrical barrel 140 to the rear and toward crossbeam 136. A portion of the hydraulic fluid under pressure from the port 168 that passes through the open valve 170 also passes through the open valve 172 and to the piston rod 134 of the hydraulic cylinder assembly 128. Hydraulic fluid supplied to the hydraulic cylinder assembly 128 through the piston rod 134 flows into chamber 186 and through a passage 188 to a chamber 190 and moves the cylindrical barrel 126 to the rear toward crossbeam 136. The pistons on the ends of the piston rods 132, 134, 146, 148, 156 and 158 are fixed to the piston rods and the crossbeams 136 and 138 and do not move. The cylinder dividing walls 133, 147 and 157 are fixed to the cylindrical barrels 126, 140 and 150 and move with the cylindrical barrels. The switch valve 164 is connected to transverse drive beam 110 and reverses the flow of hydraulic fluid from the hydraulic pump 160 when the valve rod 192 shown in FIG. 6 strikes the crossbeam 136.

The delivery of hydraulic fluid under pressure from the hydraulic pump 160 through the conduit 194 and the port 196 supplies hydraulic fluid to the piston rod 156, to the piston rod 146 through conduit 198 and to piston rod 132 through conduit 200. The piston rod 156 supplies hydraulic fluid to chamber 202 and to chamber 204 through conduit 206. This moves the cylindrical barrel 150 of hydraulic cylinder assembly 152 forward toward the crossbeam 138. The hydraulic cylinder assemblies 142 and 128 remain stationary because the valves 170 and 172 are closed and fluid is locked in the chambers 180, 184, 186 and 190. When the cylindrical barrel 150 approaches the forward end of its movement, a projection 208 on the cylindrical barrel 150 opens the valve 170. Opening the valve 170 allows fluid to return to the sump 162 from the chambers 180 and 184 and that allows hydraulic fluid under pressure supplied to the piston rod 146 to enter the chamber 212 and the chamber 214 through a conduit 216 and force the cylindrical barrel 140 to move forward. When the cylindrical barrel 140 of the hydraulic cylinder assembly 142 approaches the forward end of its movement a projection 218 on the cylindrical barrel 140 opens the valve 172. Opening the valve 172 allows fluid to return to the sump 162 from the chambers 186 and 190 and that allows hydraulic fluid under pressure supplied to the piston rod 132 to enter chamber 220 and the chamber 224 through a conduit 226 and force the cylindrical barrel 126 to move forward toward the crossbeam 138. When the cylindrical barrel 126 of the hydraulic cylinder assembly 128 reaches the forward end of its travel, the switching valve rod 192 contacts the crossbeam 138 and reverses the flow of hydraulic fluid from the hydraulic pump 160 and connects the port 196 and the conduit 194 to the conduit 210 and the sump 162. When the port 196 is connected to the sump 162, the chambers 202, 204, 212, 214, 220 and 224 are also connected to the sump 162.

The hydraulic system shown schematically in FIG. 7 is one of several systems that are available and that have been used in reciprocating floor conveyors 10. There are other systems for reciprocating floor slats that will work. For example it is possible to drive two groups of floor slats to the rear simultaneously while one group of floor slats moves forward. With this system a group of floor slats that reaches its forward limit of travel and a group of floor slats that reach their rear limit of travel reverse directions and the third group continues to move to the rear. There are also systems which divide the floor slats into more than three groups.

A flat plate 230 is mounted under the rear ends of the floor slats 50 at the rear cargo discharge opening 40. The flat plate 230 extends forward, from the rear most position of the floor slats 50, a distance that exceeds the maximum distance the floor slats are capable of being moved by the floor slat drive assembly 48. The guide beams 46 extend over the top of the flat plate 230 and are preferably anchored to the flat plate. During operation of the reciprocating floor conveyor 10, cargo is carried up to the rear discharge opening 40. The floor slats are then moved forward in groups without moving the cargo forward and the cargo is placed upon the flat plate 230. The floor slats 50 then convey more cargo to the rear and push the cargo on the flat plate 230 through the discharge opening 40.

A slant board 232 is attached to the front end wall 34 and extends from the right side wall 30 to the left side wall 32. The upper edge of the slant board is flush with the inside surface of the front end wall 34. The slant board 232 extends downwardly and rearwardly from its upper edge to a bottom edge that is adjacent to the upper surface of the floor slats 50 and that is to the rear of the rear most position of the front end surfaces of the floor slats 50.

Floor slats 50 extruded from a suitable thermoplastic resin such as polyvinyl chloride have a number of advantages over the metal floor slats that are currently used. They provide reduced total trailer weight, provide increased strength, will spring back into shape following an overload, reduce the hydraulic pressure required to reciprocate the floor slats, seal to prevent cargo loss and cargo contamination and can carry and discharge many caustic materials without damage.

Preferred embodiments of the invention have been described in detail but are examples only and the invention is not restricted thereto. It will be easily understood by those skilled in the art that modifications and variations can easily be made within the scope of this invention.

I claim:

1. A reciprocating floor conveyor having a floor support frame, a plurality of parallel guide beams secured to the floor support frame, a plurality of slide bearings attached to the guide beams, a plurality of side by side parallel floor slats supported by the slide bearings, and a drive system for reciprocating the floor slats back and forth on the slide bearings to move cargo supported by the floor slats toward one end of the floor slats or the other end of the floor slats and wherein the floor slats are elongated, thermoplastic members with an upper cargo support surface, an under surface that slides on the slide bearings and bearing surfaces on each side of each floor slat extending the length of the floor slats that are in continuous sliding and sealing contact with adjacent floor slats, except at the ends of the slats, to prevent loss of cargo, to prevent cargo contamination and to laterally position the floor slats.

2. A reciprocating floor conveyor as set forth in claim 1 wherein the bearing surface on each side of each floor slat is generally vertical.

3. A reciprocating floor conveyor as set forth in claim 2 wherein the bearing surface on each side of each floor slat intersects the cargo support surface.

4. A reciprocating floor conveyor as set forth in claim 2 wherein the floor slats are polyvinyl chloride.

5. A reciprocating floor conveyor as set forth in claim 3 wherein the floor slats are polyvinyl chloride.

6. A reciprocating floor conveyor as set forth in claim 1 wherein the bearing surface on one side of each floor slat is convex and extends the entire length of the floor slat, the bearing surface on the other side of each floor slat is concave and extends the entire length of the floor slat, the convex bearing surface is in continuous sealing contact with a concave surface on an adjacent floor slat and the concave surface is in continuous sealing contact with the convex surface on an adjacent floor slat.

7. A reciprocating floor conveyor as set forth in claim 6 wherein the floor slats are polyvinyl chloride.

8. A reciprocating floor conveyor as set forth in claim 6 wherein the bearing surface on one side of each floor slat includes a vertical surface above the convex surface extending the length of the floor slat, the bearing surface on the other side of each floor slat includes a vertical surface above the concave surface extending the entire length of the floor slat and wherein the vertical bearing surfaces on the sides of the floor slat are in continuous sealing engagement with vertical bearing surfaces on adjacent floor slats.

9. A reciprocating floor conveyor as set forth in claim 8 wherein the floor slats are polyvinyl chloride.

10. A reciprocating floor conveyor having a floor support frame, a plurality of guide beams each having a centerline running its length and wherein the guide beams are secured to the floor supporting frame with the guide beam centerlines parallel and spaced apart an equal distance, a plurality of slide bearings attached to each guide beam, a plurality of side by side floor slats supported by the slide bearings, a drive system for reciprocating the floor slats back and forth on the slide bearings to move cargo supported by the floor slats toward one end of the floor slats or the other end and wherein the space between the centerlines of the guide beams are spaced apart a distance equal to the minimum width space required for each floor slat, the floor slats are elongated thermoplastic members with an upper cargo support surface an under surface that slides on the slide bearings and bearing surfaces on each side of each floor slat extending the length of the floor slats that are in continuous sealing contact with adjacent floor slats, except at the ends of the slats, to prevent loss of cargo and cargo contamination.

11. A reciprocating floor conveyor as set forth in claim 10 wherein the bearing surface on each side of each floor slat is generally vertical.

12. A reciprocating floor conveyor as set forth in claim 11 wherein the floor slats are extruded polyvinyl chloride.

13. A reciprocating floor conveyor as set forth in claim 10 wherein the bearing surface on one side of each floor slat is convex and extends the entire length of the floor slat, the bearing surface on the other side of each floor slat is concave and extends the entire length of the floor slat, the convex bearing surface being in continuous sealing contact with a concave bearing surface on an adjacent floor slat and the concave bearing surface is in continuous sealing contact with a convex bearing surface on an adjacent floor slat.

14. A reciprocating floor conveyor as set forth in claim 13 wherein the floor slats are extruded polyvinyl chloride.

15. A reciprocating floor conveyor as set forth in claim 10 wherein the bearing surface on one side of each floor slat has a generally vertical portion and a convex portion extending the entire length of the floor slat, the bearing surface on the other side of the floor slat has a generally vertical portion and a concave portion extending the entire length of the floor slat, the vertical and convex bearing surface being in continuous sealing contact with a vertical and concave bearing surface on an adjacent floor slat, and the vertical and concave bearing surface being in continuous sealing contact with a vertical and a convex bearing surface on an adjacent floor slat.

16. A reciprocating floor conveyor as set forth in claim 15 wherein the floor slats are extruded polyvinyl chloride.

17. A method of manufacturing a reciprocating floor conveyor with a floor support frame, a plurality of parallel guide beams with a centerline extending the length of each guide beam, a plurality of slide bearings, a plurality of thermoplastic floor slats with a cargo support surface, an under surface which contacts and slides on the slide bearings and bearing surfaces on their sides, and a drive system for reciprocating the floor slats back and forth to convey cargo supported by the floor slats toward one end of the floor slats or the other including;

attaching the guide beams to the floor support frame with their centerlines parallel and with the centerlines of adjacent guide beams spaced apart, attaching the slide bearings to the guide beams, placing a floor slat over each guide beam with its under surface in sliding contact with all the slide bearings attached on the guide beam it is guided by and with the bearing surfaces on the sides in continuous sealing contact with bearing surfaces on adjacent floor slats, laterally confining the floor slats to keep all of the side bearing surfaces on the floor slats in sealing contact with adjacent floor slats; and connecting the drive system to the floor support frame and to individual floor slats to reciprocate the floor slats back and forth and convey cargo supported on the floor slats.

18. A reciprocating floor conveyor having a floor slat support assembly, a plurality of side by side parallel floor slats supported by the floor slat support assembly, and a drive assembly for reciprocating the floor slats back and forth on the floor slat support assembly to move cargo supported by the floor slats toward one end of the floor slats and wherein the floor slats are elongated thermoplastic members with a tongue on one side extending the length of the floor slats, a groove on the other side that receives the tongue of an adjacent floor slat, an upper cargo support surface on each slat that extends the length of the floor slats and from the groove to an outboard tip of the tongue and wherein the tongue has a downwardly facing surface that is in sealing contact with an upwardly facing surface of the groove of an adjacent floor slat.

19. A reciprocating floor conveyor, as set forth in claim 18, wherein the outboard tip of the tongue has a generally vertical surface which cooperates with a generally vertical surface of the groove of an adjacent floor slat to limit lateral movement of one floor slat relative to an adjacent floor slat.

20. A reciprocating floor conveyor, as set forth in claim 19, wherein the vertical surface on the outboard tip of the tongue is in sealing contact with the generally vertical surface of the groove of an adjacent floor slat.

* * * * *